United States Patent [19]

Yoshida et al.

[11] 4,039,921
[45] Aug. 2, 1977

[54] INVERTER RADIATION SUPPRESSION

[75] Inventors: Tadao Yoshida; Tadao Suzuki; Shigeaki Wachi, all of Tokyo, Japan

[73] Assignee: Sony Corporation, Tokyo, Japan

[21] Appl. No.: 691,826

[22] Filed: June 1, 1976

[30] Foreign Application Priority Data

June 11, 1975 Japan ............................ 50-70651
June 11, 1975 Japan ............................ 50-70652

[51] Int. Cl.² .................................... H02M 3/335
[52] U.S. Cl. ........................... 363/22; 331/113 A; 363/13
[58] Field of Search ................. 321/2.45 R, 8 C; 331/113 A, 67–69; 325/357; 330/68; 315/85; 307/91

[56] References Cited

U.S. PATENT DOCUMENTS

| | | | |
|---|---|---|---|
| 3,174,042 | 3/1965 | White | 321/45 |
| 3,265,982 | 8/1966 | Wilhelmsen | 330/68 |
| 3,840,798 | 10/1974 | Burchall et al. | 321/2 |
| 3,963,975 | 6/1976 | Gauper et al. | 321/2 |

FOREIGN PATENT DOCUMENTS

| | | | |
|---|---|---|---|
| 21,493 | 6/1972 | Japan | 321/45 R |
| 1,212,634 | 3/1966 | Germany | 321/2 |

OTHER PUBLICATIONS

Radio Electronics, "DC–DC Converter", vol. XXX, No. 6, p. 90, June 1959.

*Primary Examiner*—William H. Beha, Jr.
*Attorney, Agent, or Firm*—Hill, Gross, Simpson, Van Santen, Steadman, Chiara & Simpson

[57] ABSTRACT

A transistor inverter includes at least a pair of switching transistors, a transformer with primary and secondary windings, a DC voltage source with a pair of output terminals and a voltage reference terminal, and a rectifying circuit connected to the secondary winding of the transformer. A collector electrode of one of the switching transistors is insulated from a chassis by an insulation means comprising a first insulating layer, a conductive layer such as a heat sink and a second insulating layer. The conductive layer is electrically connected to the voltage reference terminal of the DC voltage source so as not to produce an undesirable radiation through the chassis.

10 Claims, 7 Drawing Figures

4,039,921

INVERTER RADIATION SUPPRESSION

BACKGROUND OF THE INVENTION

1. Field of the Invention

The present invention relates generally to a transistor inverter, and is directed more particularly to a transistor inverter in which an undesirable radiation caused by the switching operation of the transistor is avoided.

2. Description of the Prior Art

With a prior art transistor inverter, a DC voltage is subjected to a switching operation to produce an envelope pulse signal. This pulse signal is increased or boosted in voltage by a transformer and then rectified to be a desired DC voltage. In this case, as the frequency of a switching signal is high, power consumption in the transistors is reduced. Therefore, the efficiency of the inverter is enhanced. However, since a relatively high frequency of a switching signal is produced at the secondary winding of the boosting transformer in this case, there appears a leakage to the outside through the electrostatic capacity formed between the primary and secondary windings of the transformer. This leakage of the signal represents an undesired radiation which will exert a bad effect on the other electronic instruments.

In the prior art, the transformer is shielded to avoid, to some extent, the occurrence of the undesired radiation therethrough.

In general, since the potential at the case of a transistor is selected equal to that at its collector electrode, it is ascertained that the switching signal at the primary winding of the transformer is leaked to the outside thereof through the case of the transistor.

Generally speaking, the case of the transistor is attached through an insulating layer made of, for example, mica and the like to a heat sink. This heat sink is attached directly to a metal chassis, so that it is also ascertained that since the switching signal is coupled in view point of AC through the electrostatic capacity between the case of the transistor and the heat sink (or chassis), the input power source acts as a kind of antenna.

The prior art, however, fails at present to show a method to avoid an undesired radiation caused by the electrostatic capacity between the case of the switching transistor and the chassis.

OBJECTS AND SUMMARY OF THE INVENTION

Accordingly, it is an object of the present invention to provide an improved transistor inverter free from the drawback inherent in the prior art.

It is another object of the invention to provide a transistor inverter in which an electrostatic shield is provided between the case of a switching transistor and a chassis.

In accordance with an aspect of the present invention, there is provided a transistor inverter which includes at least a pair of switching transistors, a transformer having primary and secondary windings, a DC voltage source having a pair of output terminals and a voltage reference terminal and a rectifying circuit connected to the secondary winding of the transformer. The transistor inverter also comprises a device for mounting the switching transistors on a chassis with insulation means having at least a first insulating layer, a conductive layer and a second insulating layer, the insulation means being interposed between a transistor case and the chassis, and a circuit for electrically connecting the conductive layer to the voltage reference terminal of the DC voltage source.

The other objects, features and advantages of the present invention will be apparent from the following description taken in conjunction with the attached drawings.

DESCRIPTION OF THE PREFERRED EMBODIMENTS

In order to better understand the present invention, a prior art transistor inverter will be described with reference to FIGS. 1, 2A and 2B.

Figure 1:
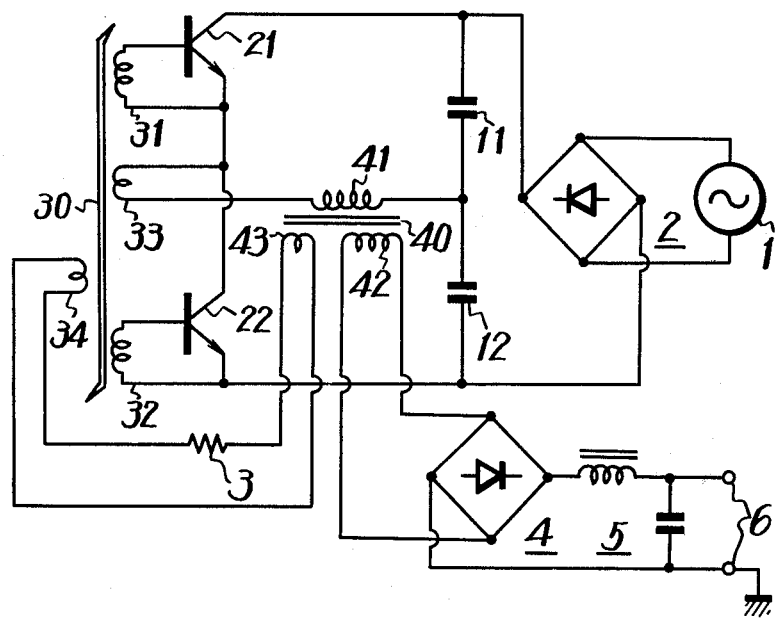
FIG. 1 is a circuit diagram showing a prior art transistor inverter.

In FIG. 1, 1 designates an AC voltage source. An input AC voltage from the AC voltage source 1 is supplied to a rectifying circuit 2 and then rectified. The rectified output signal from the rectifying circuit 2 is supplied to a series connection of capacitors 11 and 12. The series connection or path between transistors 21 and 22 is connected in parallel to the series connection of the capacitors 11 and 12. Windings 31 and 32 of an oscillation transformer 30 are connected between the base and emitter electrodes of the transistors 21 and 22, respectively. The emitter electrode of the transistor 21 and the collector electrode of the transistor 22 are connected together through a winding 33 of the oscillation transformer 30 for feeding back a current and through an input winding or primary winding 41 of a power source transfomer 40 to the connection point between the capacitors 11 and 12.

A feedback winding 43 of the transformer 40 is connected through a resistor 3 to a winding 34 of the transformer 30 for voltage feedback, and an output winding or secondary winding 42 of the transformer 40 is connected to a rectifying circuit 4 which is connected with a smoothing circuit 5 from which DC output terminals 6 are derived.

With the prior art transistor inverter shown in FIG. 1, when the transistors 21 and 22 are made ON and OFF alternately, an alternating current appears at the input winding 41 of the transformer 40. As a result, a desired DC voltage can be delivered to the output terminals 6. At this time, since the AC current flowing through the input winding 41 flows through the winding 33 of the transformer 30, the current feedback is carried out and an AC voltage induced across the winding 43 is supplied to the winding 34 to carry out the voltage feedback. Thus, the ON and OFF of the transistors 21 and 22 are repeated.

With such a prior art transistor inverter, if its oscillation frequency is selected high, for example, 20 KHz, the power source transformer 40 can be made compact and light in weight, and accordingly, the inverter itself can be made compact and light in weight.

In general, a power source transformer for a main amplifier, used in an audio instrument and the like becomes very large in size. Due to this large size of the power source transformer, the main amplifier is restricted in its size and design and also associated parts are restricted in arrangement.

However, with the inverter described above its size can be made compact and also its shape can be selected freely, so that the main amplifier using the above inverter is not restricted in size and design and also its associated parts are not restricted in arrangement.

Figure 2A:
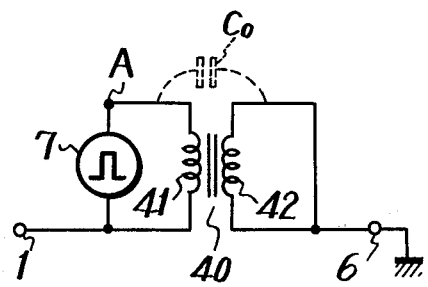
FIGS. 2A and 2B are equivalent circuits of the transistor inverter shown in FIG. 1.

The equivalent circuit of the inverter shown in FIG. 1, from an AC point of view, can be considered as shown in FIG. 2A. Since the oscillation is carried out by the transistors 21 and 22 and the oscillation transformer 30 in the inverter of FIG. 1, these elements are shown as an oscillator 7 in FIG. 2A. The power source transformer 40 is connected to the oscillator 7. In FIG. 2A, a point A represents the collector electrode of the transistor 22.

In this case, between the collector electrode of the transistor 22 and the chassis (which is not shown but generally grounded so that the chassis can be considered as the earth), there appears a capacitor Co shown in FIG. 2A by dotted lines. Therefore, the equivalent circuit FIG. 2A can be redrawn as in FIG. 2B.

In the above inverter, however, there occurs a fear that an undesired radiation will take place through the input power source 1. Especially since the oscillation of the oscillator 7 is a square wave oscillation and its oscillation frequency is rather high, undesired radiations are produced over a wide frequency range. Accordingly, when such an inverter is used as a power source of, for example, an audio instrument, its S/N ratio is deteriorated and interference will occur for other electronic instruments.

In order to avoid such defects, with the present invention the heat sink for heat radiation of the transistor 22 is connected to a zero potential point of the input side from an AC point of view and the heat sink is insulated from the chassis.

Figure 3:
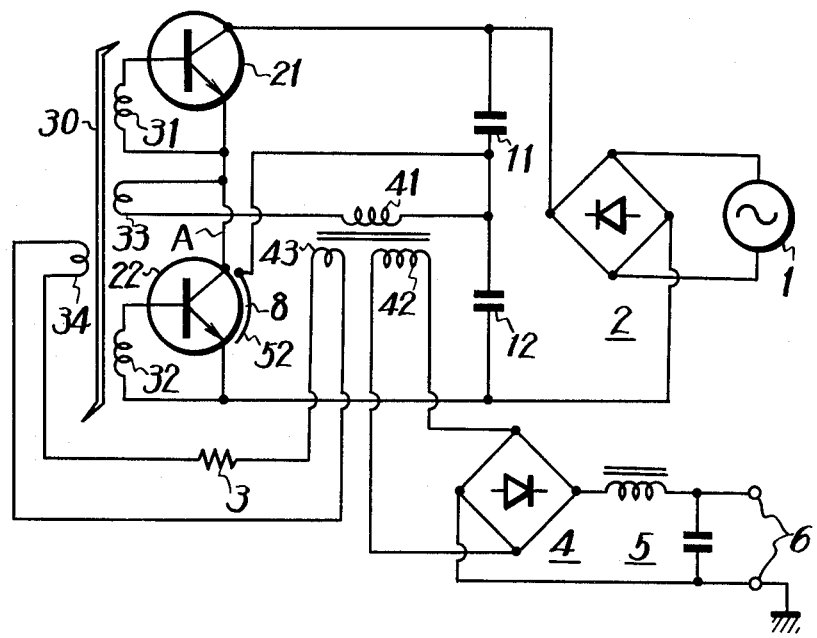
FIG. 3 is a circuit diagram showing an example of the transistor inverter according to the invention.
Figure 4:
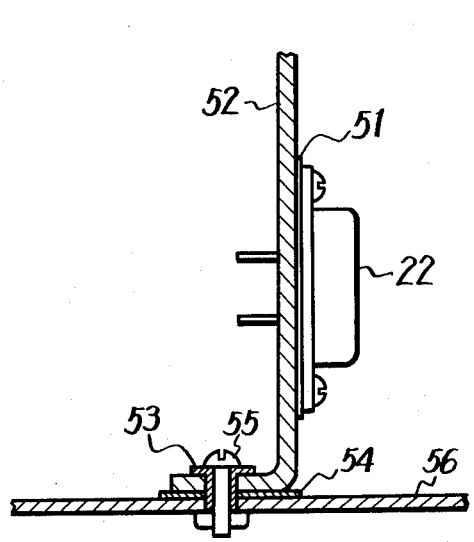
FIG. 4 is a sketch showing one embodiment of a transistor insulation means used in the transistor inverter of the invention shown in FIG. 3.

An example of the transistor inverter according to the present invention will be described with reference to FIGS. 3 and 4, in which the elements which are the same as those of FIG. 1, are shown with the same reference numerals. In general, the transistors 21 and 22 are mounted on a heat sink for heat radiation, but in this invention, the transistor whose case is made as its collector terminal, as shown in FIG. 3, is used as the transistor 22. In this case, as shown in FIG. 4, the transistor 22 is attached through an insulating thin plate 51 made of material such as mylar or the like to an L-shaped heat sink 52 made of conductive material which is then attached to a chassis 56 through insulator washers 53 and 54 by means of a screw 55. Then, the heat sink 52 is connected to the connection point between the capacitors 11 and 12, as shown in FIG. 3.

Figure 2B:
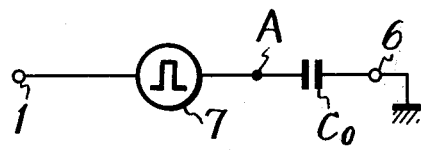
Figure 2C:
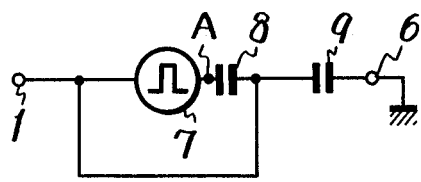
FIG. 2C is an equivalent circuit of the transistor inverter according to the present invention.

With the inverter of the present invention shown in FIG. 3, the collector electrode of the transistor 22 or the point A corresponds to the points A of the equivalent circuits shown in FIGS. 2A and 2B. In this case, as shown in FIG. 3, a capacitor 8 is formed by the case of the transistor 22 (or its collector electrode) and the heat sink 52, and a capacitor 9 is formed between the heat sink 52 and a chassis 56 (refer to FIG. 2C). The connection point between the capacitors 8 and 9 is connected to the connection point between the capacitors 11 and 12, so that the equivalent circuit of the inverter shown in FIG. 3 from an AC point of view becomes as shown in FIG. 2C. As a result, the oscillator 7 is short-circuited through the capacitor 8, so that even if an undesired radiation is produced in the oscillator 7, this undesired radiation is prevented from being delivered to the input power source 1. In other words, the input power source 1 is made equal in potential to the chassis 56 or the earth in view of AC through the capacitor 9, so that the undesired radiation which may be caused by the oscillator 7 is avoided.

In this case, since the collector electrode of the transistor 21 is connected to the capacitor 11, there occurs no problem on the transistor 21.

As described above, with the inverter of the present invention, its undesired radiation can be avoided positively and also an electronic instrument, in which the inverter of the present invention is employed, is free from deterioration in S/N ratio and from fault.

Further, the inverter of the present invention uses the heat sink 52 connected to the connection point between the capacitors 11 and 12, so that the construction of the inverter according to the invention is simple and hence inexpensive. In this case, heat radiation of the transistor 22 is not hindered.

Figure 5:
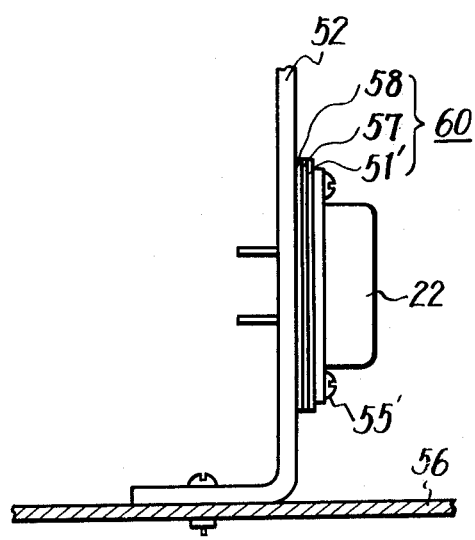
FIG. 5 is a sketch showing another embodiment of a transistor insulation means used in the invention.

Another example of the invention will be now described with reference to FIG. 5, in which reference numerals which are the same as those used in FIG. 4 designate the same elements. FIG. 5 shows only the transistor 22 and its associated parts such as the heat sink 52, chassis 56 and so on of the second example according to the invention, but its other circuit construction is substantially the same as that of FIG. 3. Therefore, its detailed description will be omitted. In the example of FIG. 5, a shield plate 60 is inserted between a transistor 22 and a heat sink 52 and the shield plate 60 is connected to a zero potential point of the input side, between the capacitors 11 and 12.

In general, the transistors 21 and 22 are attached to the heat sink for heat radiation, but in this example such a transistor, whose case serves as its collector terminal, is employed as the transistor 22. In this case, as shown in FIG 5, the transistor 22 is attached to the heat sink 52 by insulated screws 55' through the insulating shielding plate 60, which is composed of an insulating thin plate 51' made of mylar or the like, a shield plate 57 and an insulating thin plate 58 which are laminated, and the heat sink 52 is attached to the chassis 56 by means of, for example, a screw. The shield plate 57 is connected to the connection point between the capacitors 11 and 12. The other circuit construction is substantially the same as that of the example shown in FIG. 3, so that its description will be omitted, as mentioned above.

With the circuit construction described above in connection with FIG. 5, the collector electrode of the transistor 22 corresponds to the point A in the equivalent circuits shown in FIGS. 2A and 2B. In this case, there is formed the capacitor 8 by the case (collector electrode) of the transistor 22 and the shield plate 57, and also the capacitor 9 is formed between the shield plate 57 and the heat sink 52 or chassis 56, as shown in FIG. 2C. In this case, the connection point between the capacitors 8 and 9 is connected to the connection point between the capacitors 11 and 12, so that it can be said that the equivalent circuit shown in FIG. 2C is also the equivalent circuit of the inverter using the transistor 22 described in connection with FIG. 5. Thus, the oscillator 7 is short-circuited through the capacitor 8, so that even if an undesired radiation is produced from the oscillator 7, this undesired radiation is prevented from being delivered to the input power source 1 as in the first example of the present invention.

It will be apparent that many modifications and variations could be effected by one skilled in the art without departing from the spirit and scope of the novel concepts of the present invention.

We claim as our invention:

1. In a transistor inverter including at least a pair of switching transistors, a transformer having primary and secondary windings, a DC voltage source having a pair of output terminals and a voltage reference terminal, and a rectifying circuit connected to the secondary winding of said transformer, said transistor inverter further comprising:
   a. insulation means for mounting one of said switching transistors on a chassis which comprises at least a first insulating layer, a conductive layer and a second insulating layer interposed between a transistor case and said chassis;
   b. means for electrically connecting said conductive layer to the voltage reference terminal of said DC voltage source.

2. A transistor inverter according to claim 1, in which said conductive layer comprises a heat sink.

3. A transistor inverter according to claim 2, in which said heat sink is of an L-shaped type, said first insulating layer is interposed between one side of the longitudinal surface of said heat sink and the lower surface of said transistor case, the lateral portion of said heat sink is mounted on the chassis with said second insulating layer interposed therebetween by using an insulating washer and a screw.

4. A transistor inverter according to claim 1, further including a heat sink interposed between said second insulating layer and chassis.

5. A transistor inverter according to claim 4, in which said heat sink is of an L-shape, said insulation means is mounted between said transistor case and one side of the longitudinal portion of said heat sink, and the lateral portion of said heat sink is directly mounted on the chassis.

6. A transistor inverter according to claim 1, in which each of said switching transistors has base, emitter and collector electrodes, each of the collector-emitter electrodes thereof being connected between the output terminals of said DC voltage source through the primary winding of said transformer, respectively, a pair of capacitors being connected between the output terminals of said DC voltage source, the connection point of which makes said voltage reference point so as to be connected with said conductive layer of said insulation means.

7. A transistor inverter adopted for suppression of self-generated interference components comprising:
   a. a DC voltage source having first and second output terminals and a voltage reference terminal;
   b. an output transformer having primary and secondary windings, one end of said primary winding being connected to said reference terminal;
   c. first and second switching transistors, each having a case connected to its collector, said first transistor having its collector connected to the first output terminal and its emitter connected to the other end of said primary winding of the output transformer, said second transistor having its collector connected to the first transistor emitter and its emitter to the second output terminal;
   d. feedback means connected between bases of said switching transistors and said output transformer;
   e. insulation means interposed between said second transistor and a chassis, said insulation means comprising a first insulating layer, a conductive layer and a second insulating layer; and
   f. means for electrically connecting said conductive layer to the voltage reference terminal of said DC voltage source.

8. The inverter of claim 7, in which said conductive layer comprises a heat sink insulated from said chassis by said second insulating layer.

9. The inverter of claim 7, in which a heat sink is directly mounted to said chassis and said insulation means is interposed between the heat sink and said second transistor.

10. The inverter of claim 7, in which said first transistor collector is bypassed to the reference terminal by a capacitor in said DC voltage source between said first output and voltage reference terminals.

* * * * *